(No Model.)  6 Sheets—Sheet 1.

W. KOCH & C. E. HADLEY.
CASH INDICATOR AND REGISTER.

No. 398,626.  Patented Feb. 26, 1889.

Attest:
A. N. Jesbera
E. M. Watson.

Inventors:
William Koch
Charles E. Hadley
By David A. Burr
Atty.

(No Model.) 6 Sheets—Sheet 2.
W. KOCH & C. E. HADLEY.
CASH INDICATOR AND REGISTER.
No. 398,626. Patented Feb. 26, 1889.
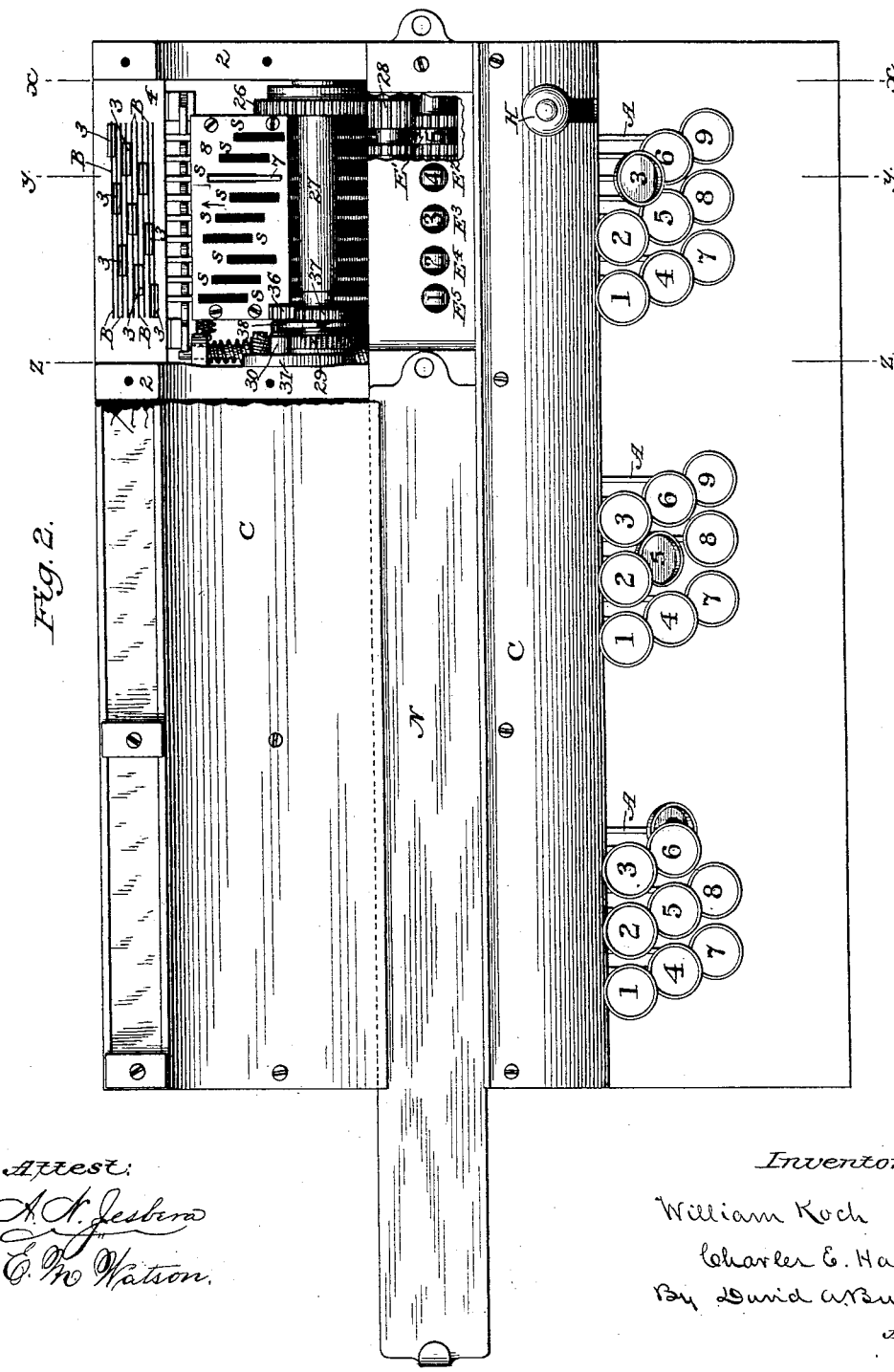

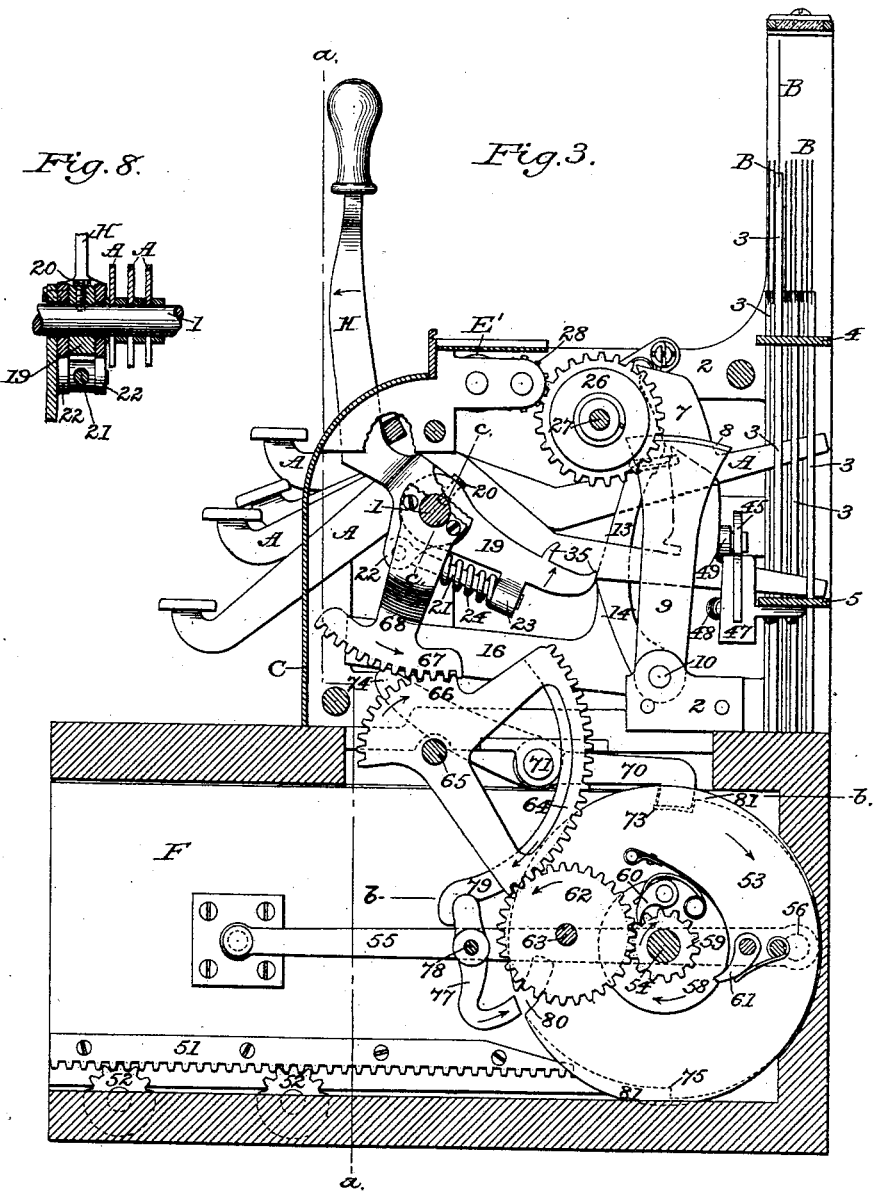

(No Model.) 6 Sheets—Sheet 4.
W. KOCH & C. E. HADLEY.
CASH INDICATOR AND REGISTER.
No. 398,626. Patented Feb. 26, 1889.
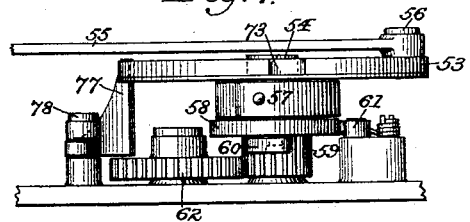
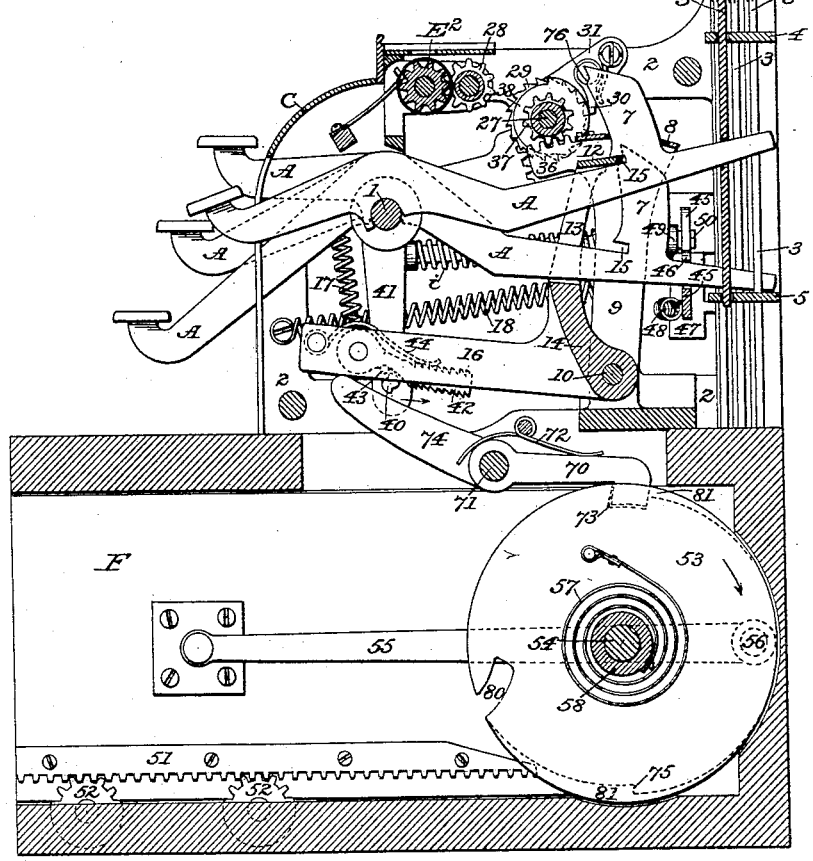
Attest:
A. N. Jenkins
E. M. Watson
Inventors:
William Koch
Charles E. Hadley
By David A. Burr
Atty.

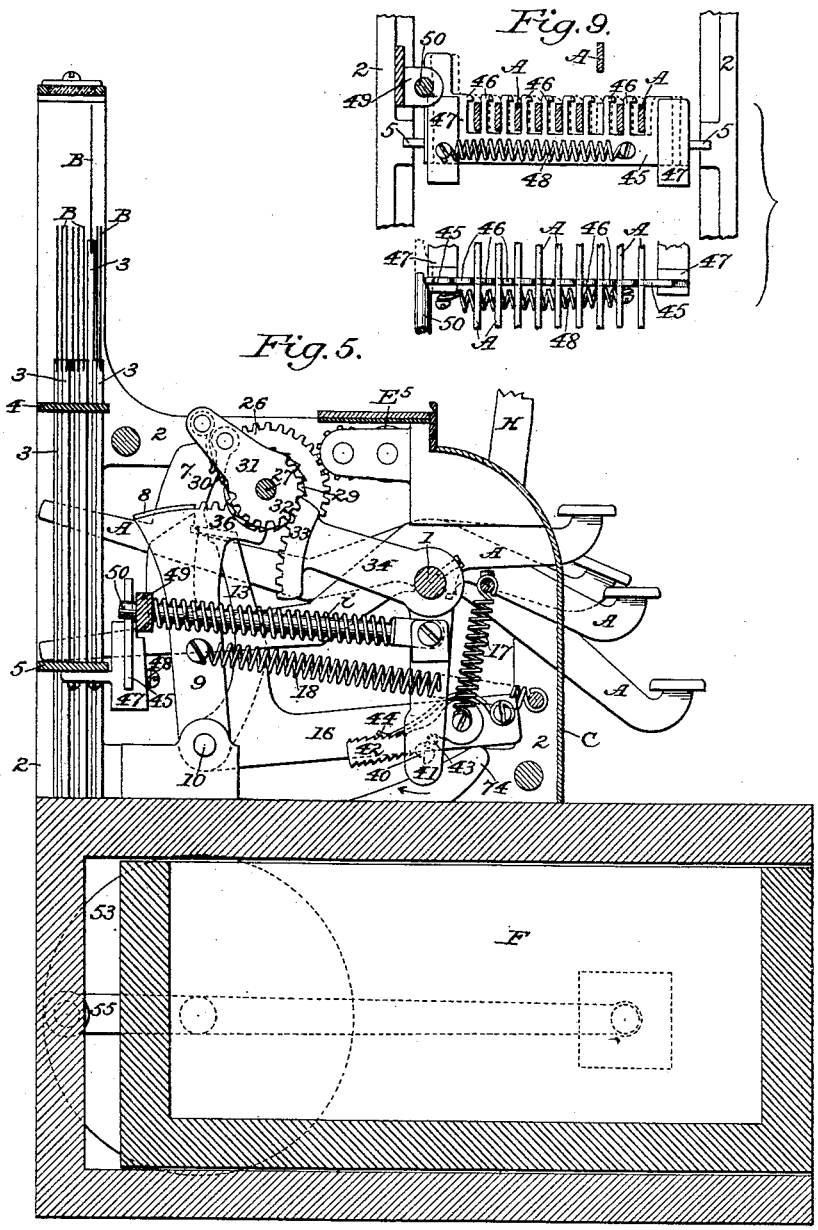

(No Model.) 6 Sheets—Sheet 6.

W. KOCH & C. E. HADLEY.
CASH INDICATOR AND REGISTER.

No. 398,626. Patented Feb. 26, 1889.

Attest:
A. N. Jesbera
E. M. Watson

Inventors:
William Koch
Charles E. Hadley
By David A. Burr
Atty.

UNITED STATES PATENT OFFICE.

WILLIAM KOCH, OF NEW YORK, N. Y., AND CHARLES E. HADLEY, OF WASHINGTON, DISTRICT OF COLUMBIA; SAID HADLEY ASSIGNOR TO SAID KOCH.

CASH INDICATOR AND REGISTER.

SPECIFICATION forming part of Letters Patent No. 398,626, dated February 26, 1889.

Application filed March 23, 1888. Serial No. 268,432. (No model.)

*To all whom it may concern:*

Be it known that we, WILLIAM KOCH, of the city, county, and State of New York, and CHARLES E. HADLEY, of Washington city, in the District of Columbia, have invented certain new and useful Improvements in Cash Indicating, Registering, and Adding Machines; and we do hereby declare that the following is a full and exact description thereof, reference being had to the accompanying drawings, and to the letters of reference marked thereon, making part of this specification, in which—

Figure 1:
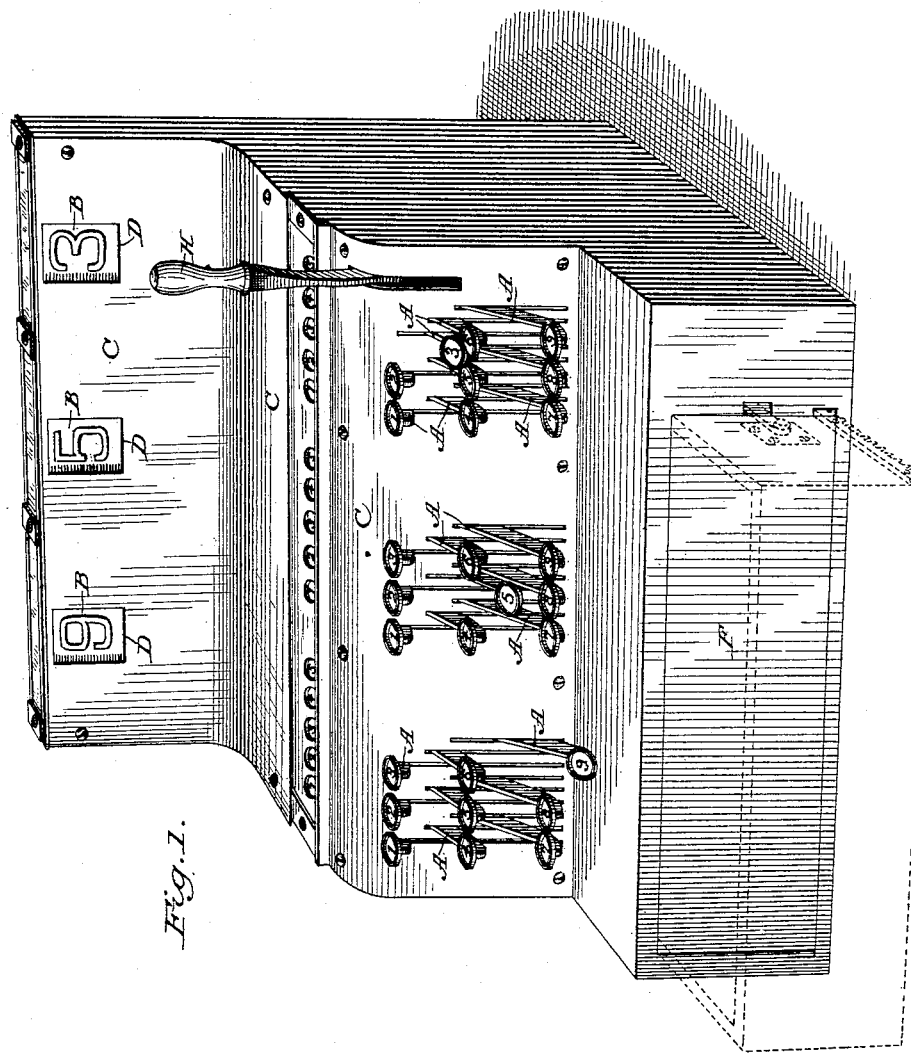
Figure 10:
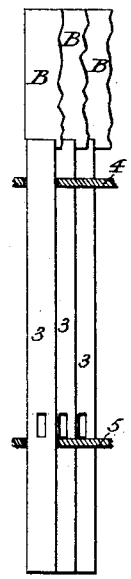
Figure 6:
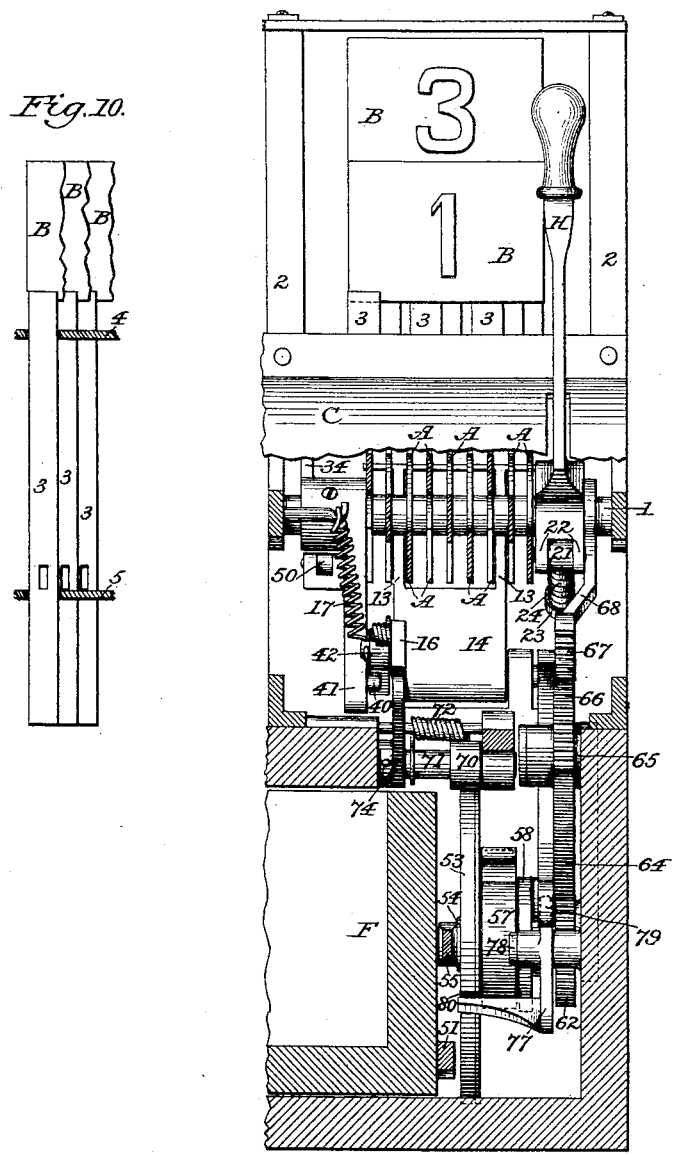
Figure 11:
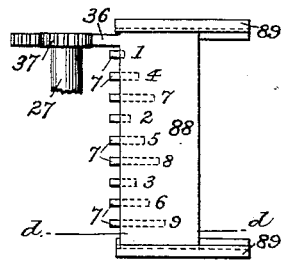
Figure 12:
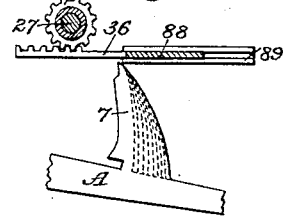
Figure 13:
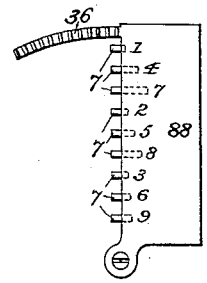

Figure 1 is a view in perspective of a cash indicating and adding machine constructed to embody our invention; Fig. 2, a top or plan view of the same with a portion of the casing and frame broken away or removed; Fig. 3, a transverse section in the line $x\ x$ of Fig. 2; Figs. 4 and 5, similar sections in lines $y\ y$ and $z\ z$, respectively, of said Fig. 2; Fig. 6, an irregular vertical section at right hand of the machine in line $a\ a$ of Fig. 3, the casing covering the sign-tablets being removed; Fig. 7, a horizontal section in line $b\ b$ of Fig. 3, giving a plan view of the mechanism for automatically moving the drawer contained in the base of the machine; Fig. 8, a detached section in line $c\ c$ of Fig. 3, illustrating the connection of the hand-lever with the rock-shaft; Fig. 9, a detached elevation and plan, respectively, of the locking-plate for holding fast the keys during the movement of the hand-lever; Fig. 10, a detached elevation of a group of the sign-tablet rods with the tablets partly broken away; Fig. 11, a detached plan view of a modification in construction and arrangement of the controlling-plate by which the adding mechanism is governed in the movement of the keys, Fig. 12 being a transverse section in line $d\ d$ of Fig. 11, illustrating the modified form of the key-plates; and Fig. 13 illustrates yet another modification in arrangement of the controlling-plate, wherein it is pivoted to swing in a horizontal plane.

Our invention relates to that class of machines which are designed to indicate and register the cash receipts in stores, saloons, and other public places, and which are provided with mechanism for displaying the amount last paid in and for adding and registering automatically the sum total of receipts after each payment.

It has for its object to provide for the automatic opening and closing of a cash-drawer in connection with the machine and to render, by means of improved mechanism, the operations of the machine more simple and efficient.

It consists in the novel mechanical devices hereinafter described, and specifically set forth in the claims.

Each of our improved cash-machines may embrace one or more sets or groups of keys—nine in number. Each key in each group is designated by a figure on its outer end representing one of the nine digits, and each is made, by the depression of its outer end in manner as hereinafter set forth, to lift into view at an opening in the upper part of the machine a tablet or sign bearing a corresponding figure. The first group of keys is thus adapted to indicate payments from one cent to nine; a second group, payments from ten to ninety cents; a third, from one to nine dollars, &c.

The machine illustrated in Figs. 1 and 2 of the drawings is represented as having three groups of keys to indicate and register any amount from one cent to nine dollars and ninety-nine cents. Each key A is in fact a lever of the first order, and all the keys in each set are pivoted loosely upon a common transverse rock-shaft, 1, supported at each end in a suitable frame-work, 2 2 2, adapted for the support of the operative parts of the machine. The outer ends of the keys are bent at different angles, so that when normally at rest these ends shall be arranged in three horizontal tiers or rows, the keys in each lower row being longer than those in the row above it, as shown in Figs. 1, 3, 4, and 5. Counting the keys in each group from left to right in their order on their pivotal shaft, the outer ends of the first, fourth, and seventh are, by preference, thus brought, respectively, into the upper row, the second, fifth, and eighth into the middle row, and the third, sixth, and ninth into the lower row; but they are severally designated by figures running in order from left to right in each row, beginning with the figure 1 in the first row, 4 in the second, and 7 in the third, said figures being marked upon suitable key-plates or disks affixed to the outer ends of the keys, as shown in Figs. 1 and 2. The inner ends of the keys extending to the rear of the machine are jointed each to a separate vertical rod, 3, mounted to play longitudinally through slots in an upper and lower guide-plate, 4 and 5, secured in the frame-work 2 2, (see Figs. 2, 3, 4, and 5,) so that key and rod shall move together in both directions. The rods 3 3 3 are arranged in three rows and in echelon, one behind the other, as shown in Figs. 2 and 10, so as to bring them into compact form without interference. A wide tablet or sign-plate, B, is secured to the upper end of each rod. These tablets are all uniform in size to admit of separate display at a single opening, D, in the upper part of the casing C, and upon each a figure corresponding to that upon the disk of the key actuating the rod carrying said tablet is marked. It will be observed that each tablet-rod 3 is thus connected to a key, so as to be positively actuated thereby in either direction without any independent movement, and that by depressing the outer end of the key its appropriate tablet will be elevated, so as to bring it into line of sight at the opening D, as shown in Fig. 1, while a return of the key to its normal position will cause the tablet to drop out of sight.

The operation or play of a second key in a group, after any one of them has been moved to elevate its tablet B, (and we shall hereinafter designate such a movement by the term "played,") is prevented until the key has returned to its normal position by the movement of a controlling-plate, 8, (see Fig. 2,) mounted to reciprocate transversely above the keys upon the upper ends of two oscillating arms, 9 9, (see Figs. 4 and 5,) which are pivoted to swing loosely, each in a vertical plane, upon a transverse shaft, 10, passing under the keys and fixed in the lower portion of the frame. This movement of the controlling-plate 8 is produced when any one key is played by means of a finger, 7, (see Fig. 4,) made to project upwardly from the inner end or arm of each key virtually as an integral part thereof in position to enter a slot, S, in the controlling-plate. The front and rear edges of the keys are curved each to follow an arc having the pivot of the key as its center, so that it will work freely through the slot or aperture S in the controlling-plate 8, and the upper end of each finger 7 is beveled from front to rear, so as to present an inclined surface, which, when the front point of the finger enters the slot in the reciprocating controlling-plate 8, will operate when brought into contact with the rear end wall of the slot to force the controlling-plate back, so as to allow the finger to pass upward through it and permit the full movement or play of the key required to display its tablet.

The several slots S S in the reciprocating controlling-plate 8 (see Fig. 2) are so arranged and adjusted with reference each to the other and to the actuating-fingers 7 7 beneath as that the movement of each finger 7 through its appropriate slot shall operate to swing back the controlling-plate 8 a distance proportionate to the number of units indicated by the figure on said key. In brief, the finger or key 1 will, in passing upward through its slot in the controlling-plate 8, move it back a limited distance. Taking the length of this movement of key 1 as one degree or unit, the play of key 2 will operate to move the controlling-plate two degrees; of key 3, three degrees, &c. The movement of the controlling-plate by any one key will thus operate to so far change the position and register of the slots appropriate to the several fingers of the remaining keys as that so long as the finger of any one key remains elevated no one of the others can pass up fully into its slot; hence the play of any one key in a group will, by reason of the differential movement of the controlling-plate actuated thereby, operate to prevent any other key in the same group from being effectively played until the first has been returned to its normal position. The controlling-plate is swung forward automatically when free by means of a spring, 18, attached to one of the arms 9, carrying the plate, as shown in Fig. 5.

The rear end of each depressed key is held up and automatically locked so soon as it reaches its highest position by means of a transverse strip, 12, (see Fig. 4,) secured at its ends to oscillating arms 13 13, united by said strip and by a parallel bar or plate, 14, and pivoted loosely upon the shaft 10, so as to swing to and from the fingers 7 7 above the keys and under the controlling-plate 8.

A notch, 15, (see Fig. 4,) is cut at the base of each finger 7 at its intersection with its key A, and when the finger is fully elevated the edge of the transverse strip 12 will automatically engage said notch and thereby hold the key.

The automatic movement of the pivoted arms 13 13, carrying the locking-strip 12 and connected by the bar 14, is secured by means of a lever, 16, projecting forward from one end of the bar 14 at a right angle therewith and on a line with the pivotal shaft 10, and by a spiral spring, 17, attached to the forward end of the lever to draw it upward, as shown in Figs. 4 and 5.

The locking-strip 12, having locked the keys in manner as described, will hold them until it is released by a depression of the lever 16, which may be effected, as hereinafter described, by a movement of a separate hand-lever, H, which serves likewise to operate the adding-wheels and the cash-drawer of the machine.

The hand-lever H is forked at its inner end (see Fig. 8) and is pivoted loosely upon one end of the rock-shaft 1, which serves also as a pivotal support for the keys A A. The arms 22 22 of the fork embrace the inner end of a radial arm, 19, which is likewise mounted on the shaft, but is fixed thereto by means of a set-screw, 20. (See Figs. 3 and 8.) The handle or hand-lever H is coupled to said arm 19 by means of a rod, 21, pivoted between the arms 22 22 of its forked end, which project radially beyond the axis for the purpose, the opposite end of the rod being made to pass freely through a perforated lug, 23, formed on the under side of the arm 19, as shown in Figs. 3 and 6. A spiral spring, 24, is coiled upon the rod 21 between its inner pivoted end and the lug 23, so that when the handle is swung forward, so as to force the rod through its bearing in the lug, the spring 24 will be compressed until the resistance of the rock-shaft 1, to which the arm 19 is fixed, is overcome and the shaft is made to turn upon its axis. By means of the lost motion thus produced in the connection of the hand-lever H with the rock-shaft 1 the elasticity of the interposed spring 24 is brought into play to ease the stroke of the handle H and prevent any jarring in the operation.

The adding mechanism for the machine may be of any approved description, to be operated by the revolution of a units-wheel, E', and its construction need not herein be particularly described.

The adding-wheels E' E² E³, &c., are preferably mounted above the keys upon a shaft parallel with a rock-shaft, 1. They are operated by the revolution of a master-wheel, 26, fixed upon one end of a parallel shaft, 27, and which is geared by the intervention of an intermediate pinion, 28, with the units-wheel E' of the adding-train, as shown in Fig. 3. The shaft 27 is made to rotate by means of a ratchet-wheel, 29, fixed upon the opposite end thereof (see Figs. 2 and 5) and driven by a spring-actuated pawl, 30, pivoted upon the end of an oscillating arm, 31, swinging upon said shaft, and which projects radially from a segmental rack, 32, that gears with a counterpart rack, 33, upon the end of an arm, 34, fixed to the rock-shaft 1.

The master-wheel 26 is so proportioned with reference to the units-wheel E' as that the partial rotation of the shaft 27, produced by a full stroke of the pawl-arm 31, will operate to produce one complete revolution of the units-wheel. A full stroke of the pawl-arm is effected at each full downward stroke of the hand-lever H by the movement of the arm 34, extending from the shaft 1, actuated by said lever, the movement of the arm 34 being communicated to the pawl-arm by the intermediate segmental racks, 32 and 33, as described.

The forward downward stroke of the hand-lever H from its normal vertical position is arrested by an engagement of the end of the arm 19 with the teeth of the master-wheel 26, (see Fig. 3,) the end of the arm being formed with stops 35 thereon, adapted to lock with said teeth. By this means the wheel 26 is positively arrested the instant the down-stroke of the hand-lever H is completed and the overrunning of the wheel and adding-train by reason of the momentum which it may acquire effectually prevented.

A proportional movement of the units-wheel E' to correspond with the number of any key played is obtained by means of the differential movement of the reciprocating controlling-plate 8, actuated by the finger 7 working through it, one end of said controlling-plate being made to carry for the purpose a rack, 36, (see Fig. 5,) adapted to engage a counterpart rack or a pinion, 37, mounted to turn loosely upon the shaft 27 in close proximity to the ratchet-wheel 29, by which said shaft 27 is intermittently rotated.

A controlling-disk, 38, (see Figs. 2 and 4,) is interposed between the rack or pinion 37 and the ratchet-wheel 29, and a portion of its circumference is so enlarged in diameter as to project radially beyond the contiguous teeth of the ratchet-wheel. The pawl 30 is of such width as to overlap said controlling-disk, so that when the pawl rests upon the radially-enlarged portion of the periphery of the disk it is held thereby out of contact with the ratchet. The length of the enlarged portion of the disk is so proportioned and it is so adjusted with reference to the pawl as that when the controlling-plate 8 is in its first position before it has been moved by an actuating-finger 7 said enlarged portion covers the full length of the stroke of the pawl over the ratchet, and hence prevents its engagement therewith, and consequently any movement thereby of the shaft 27 and the adding mechanism, which it actuates. The disk is automatically carried to this position by the weight of the tablet-rod, the tablet B upon the outer end of the key operating to depress the finger actuating the controlling-plate, and also by the action of the spring 18, which tends to draw the controlling-plate and its rack forward, as shown in Fig. 5. The ratchet-teeth on the ratchet-wheel 29 are furthermore so proportioned with reference to the master-wheel 26 and to the unit of movement of the guard-plate 8 as that when the plate has been swung forward one degree or unit by the transverse movement through one of its slots 8 of the actuating-finger of key 1 it will thereby so move the controlling-disk 38 as to turn back the enlarged portion of the periphery of the disk far enough to allow the pawl to engage the ratchet during so much of its stroke as will cause it to turn the ratchet-wheel the distance required to produce a movement of the units-wheel in the adding mechanism one point and no more. When the plate 8 has been swung forward by the play of the 9 key, then the ratchet-wheel is so far uncovered by the corresponding movement of the controlling-disk 38 as that the pawl will cause the wheel to turn the distance required to produce a nine-tenths revolution of the units-wheel.

As an equivalent for the oscillating slotted controlling-plate 8, (illustrated in Figs. 2, 3, and 4,) we contemplate the use of an imperforate controlling-plate, 88, having a straight edge, (see Figs. 11 and 12,) and mounted to reciprocate on suitable horizontal ways, 89 89, transversely over the keys 7, in position to be engaged and forced back by the rear edge of the actuating-fingers on the keys when they are forced up, a rack, 36, at one end thereof being made to engage the pinion 37 of the controlling-disk. In this case the actuating-fingers are severally made differential in width at their base or inner ends, so that when severally carried up they shall operate to force the controlling-plate back more or less, according to their width, the finger for key 1 being made of least and that for key 9 of greatest width, as illustrated by the dotted lines in Fig. 11. As a further modification of this part of our invention, the plate 88 may be pivoted at one end to swing in a horizontal plane over the keys and fingers, as shown in Fig. 13, the rack 36, gearing with the pinion 37 of the controlling-disk, being carried upon the free end of the plate. In such case the difference in the width of base of the fingers is determined by their position relatively to the pivot of the plate 88, as illustrated by the dotted lines in Fig. 13.

After a key has been played, its outer exposed or finger end remains depressed and the tablet actuated thereby remains elevated and in sight at the opening D in the casing C by reason of the automatic locking of the key, as described, until the hand-lever H has been moved from its normal upright position and made to complete its forward or down stroke. Thus the figure indicating the key last played, and consequently the amount of cash last paid in, is kept displayed until, by the movement of the adding mechanism, produced, as described, by said downward movement of the hand-lever, it has been added to the sum previously registered. The key and its tablet are then released by means of the return-stroke or upward movement of the hand-lever H, this release being accomplished through the operation of a pin, 40, (see Figs. 4, 5, and 6,) projecting from the inner side of the arm 41, fixed to the rock-shaft 1, to project radially therefrom alongside of the arm 16, which governs, in manner as hereinbefore described, the locking-stop 12, engaging the actuating-fingers 7 7. A latch-bar, 42, is pivoted to the side of the arm 16, next to the arm 41, so that the pin shall underlie the lower projecting edge of the bar, near to its pivot, (see Figs. 4 and 5,) when the hand-lever H is in its vertical position.

As the hand-lever is swung down to move the adding mechanism, the arm 41 is swung back, and the pin 40, moving under the pivotal latch-bar 42, will lift its outer end until, having passed beyond it, said end is left free to drop back to its first position, presenting an incline over and upon which the pin will ride on the return-stroke of the arm 41, and thereby bear it, with the arm 16, to which it is pivoted, down, so as to cause the connected arm 13 to swing out and carry the locking-strip 12 free from the finger on the key which it engaged and locked. The latch-bar 42 is prevented from dropping too far by means of a stop-pin, 43, (see dotted lines in Figs. 4 and 5,) and is borne down by a spring, 44, bearing upon its upper edge. To prevent a reverse movement of the arm 41, and consequently of the hand-lever H during any portion of its stroke, the upper and lower edges of the latch-bar 42 are notched to form a ratch, the teeth of which are inclined in the direction in which the arm is free to move, (see Fig. 5,) and the pin 40 is formed with counterpart angular faces on its upper and lower sides (see Fig. 4) to properly engage said teeth in passing over them.

All the keys in each group, excepting the one which has been played, are locked so soon as the hand-lever is moved from its normal vertical position, and are kept locked until it has returned to said position, by means of a transverse plate, 45, (see Fig. 9,) fitted to slide edgewise in suitable ways in blocks 47 47, secured to the lower plate, 5, through which the tablet-bars 3 3 play, and from whose upper edge pins 46 46 are made to project upwardly between the keys. Each pin is formed at its upper end above the key with a lateral offset, constituting a catch, which, projecting in the direction of the length of the plate, will, when the plate is moved longitudinally, overlap the upper edge of the key, and thus prevent it from moving. The catches are so proportioned in respect to the space between the keys (see Fig. 9) as to permit them to wholly clear the keys when drawn fully back therefrom. The plate is automatically drawn back to cause the catches to clear the keys by means of a spring, 48. It is forced forward to lock the keys by means of an inclined face upon the end of a rod, 50, fitted to move at right angles to the plate through an offset, 49, formed to support and guide it on the frame 2, the inner end of the rod being pivoted to the arm 41 of the rock-shaft 1, actuated by the hand-lever H, so as to move with it. A spring, $i$, coiled upon said rod 50, (see Fig. 5,) so as to be compressed when the arm 41 swings back, serves to produce an automatic return of the hand-lever H to its vertical position after it has completed its full downward stroke.

The machine is provided with a cash-drawer, F, mounted upon friction-rollers in the base thereof, so as to move easily in and out at the front, or, preferably, upon lateral racks 51, resting upon a series of pinions, 52 52, (see Fig. 3,) mounted to turn freely in suitable bearings beneath the drawer at each end, whereby the drawer is prevented from binding in its movements by reason of any twisting thereof due to the application of power to one end only.

The drawer F is moved in and out by the revolution of a disk, 53, (see Fig. 4,) mounted at one end of the drawer to turn loosely upon a stud-axle, 54, (see Fig. 6,) projecting from the frame-work of the base. This disk is connected with the drawer by means of a connecting-rod, 55, pivoted to one side of the drawer near the front thereof, and which, extending back of the drawer, is also pivoted to a crank-pin, 56, on the disk 53. (See Figs. 3 and 4.) The disk is so proportioned in diameter as that a semi-revolution thereof will suffice to open the drawer, and a complete revolution will consequently operate not only to open it, but to close it again. The disk is made to revolve automatically in the proper direction to first open and then close the drawer by means of a helical spring, 57, (see Figs. 4 and 6,) made fast at one end to the disk and at the other to the hub of a second smaller disk, 58, mounted outside of the first to revolve loosely upon the same axle, 54, the spring being interposed between the two, so as to encircle the hub of the disk 58, as shown in Figs. 4, 6, and 7. A pinion, 59, Figs. 3 and 7, of smaller diameter than the disk 58, is mounted to turn loosely in proximity thereto on the same axle, 54, and a spring-actuated pawl, 60, is pivoted to the side of the disk to drop into engagement with said pinion and permit its independent revolution in one direction only, so that a reverse movement of the pinion will operate to carry the disk with it and thereby wind up the spring, when the main disk 53 is held fast. A pawl, 61, pivoted to the outside case, engages a single notch on the periphery of the disk 58 at each revolution of the disk, so as to prevent a return movement thereof when in the winding up of the spring said disk has made a complete revolution.

The pinion 59 is geared to a toothed wheel, 62, revolving upon an independent stud-axle, 63, fixed to the frame-work of the base of the machine. This wheel 62 is geared in turn to a large toothed segment, 64, swinging upon a stud-axle, 65, projecting from the frame of the base on a level just above the top of the drawer F, as shown in Figs 3 and 6, and a second smaller toothed segment, 66, made in one with the segment 64 to turn therewith on the same axis, but to project from the opposite side of said axis, as shown in Fig. 6, gears with a toothed segment, 67, on the end of an arm, 68, projecting from the hub of the hand-lever H, (see Fig. 3,) so that the downward movement of the hand-lever will operate, through the gears 67 64 62, to revolve the pinion 59, and by means of the engagement of the pawl 60 with said pinion to turn the disk 58 with it, so as to wind up the spring.

The train of gear is so proportioned as that a single downward movement of the hand-lever H will operate to produce a single complete revolution of the disk 58, and the notch on the periphery of the disk is so located as that when such a complete revolution of the disk is effected its return is prevented by the engagement of the pawl 61 with said notch. During the reverse movement of the hand-lever and of the gears actuated thereby the pawl 60 will allow the pinion 59 to revolve independently of the disk 58, held by the pawl 61, in manner as described.

The large disk 53, to which one end of the spring 57 is secured, is held fast while the spring 57 is being wound up by the revolution of the disk 58, to which the inner end of the spring is secured, by means of a pawl, 70, projecting radially from a rock-shaft, 71, said pawl being made to drop, under the influence of a spring, 72, into a notch, 73, cut in the periphery of the disk, as shown in Fig. 4. The rock-shaft 71 is extended parallel with the key-shaft 1 of the machine far enough to permit a radial arm, 74, projecting from said rock-shaft, to pass immediately under the free end of the arm 16, by which the strip 12, for locking the keys when elevated, is actuated. The depression of said arm 16, produced in manner as described by the upward movement of the hand-lever H, is thus made not only to unlock the key last played, but by its bearing upon the arm 74 to rock the shaft 71 sufficiently to lift thereby the pawl 70 from the disk 53, leaving the latter free to turn under the influence of the spring 57, previously wound up, in manner as described, by the downward movement of the same hand-lever, H.

The first half-revolution of the disk 53, after its release from the pawl 70, will operate, by means of the crank-pin 56 and connecting-rod 55, to push the drawer F outward, while its continued revolution for more than a half-turn will pull the drawer inward again. To prevent the inward movement of the drawer after it has been opened, a second notch, 75, is cut in the periphery of the disk 53, diametrically opposite the first notch, 73, so as to be engaged in like manner by the pawl 70. This second notch, 75, is, however, much less in depth than the first notch, 73, so that a release of the pawl therefrom may be effected by a comparatively slight movement of the rock-shaft 71. This slight movement takes place whenever a key is played by reason of the action of an incline, 76, formed on the edge of the outer end of the finger on the key at the point of its contact, when in its normal or depressed position with the locking-strip 12, as shown in Fig. 4. This incline operates, as the finger carried by the key begins to rise, to force out the strip 12 far enough to cause a movement of the arm 16 sufficient to trip the pawl 70, so as to release it from the notch 75. Hence the extreme depression of the arm 16, produced by the return movement of the hand-lever H after it has been depressed, will release the pawl 70 from the first or deep notch, 73, of the spring-actuated disk 53, and thereby allow it to make a half-revolution and push out the drawer, at which point the movement of the disk will be arrested by the engagement of the pawl with the second or lesser notch, 75. It will be then held there until, by playing one of the keys, the pawl 70 will again lift far enough to clear said lesser notch and allow the disk to complete its revolution and thereby close the drawer again.

To prevent a movement of the drawer during the movement of the hand-lever H, a bent latch, 77, is pivoted upon a stud, 78, in the frame in such position as that by an engagement of a finger, 79, projecting from the lower end of the segment-rack 64 on its inner side, with the upper end of the latch (see Figs. 3 and 6) its lower bent end shall be swung in toward the periphery of the disk 53 to engage a deep notch, 80, cut therein in such position as that it will register with the latch when the disk is held by the pawl 70.

Since the segmental rack 64 and the disk 53 are in different vertical planes, the lower bent end of the latch 77 is made wide enough to extend parallel with the axes of the disk and rack across from the plane of the one to the other, as shown in Fig. 6. As the latch swings forward into the notch in the disk, the finger 79 is carried by the revolution of the segment about its axis clear and free from the latch. Upon the return of the segment the finger re-engages the latch to withdraw it from the disk. The disk 53, and consequently the drawer F, is thus locked at the first movement of the hand-lever and unlocked again just as the handle returns to its first position.

To prevent an engagement of the pawl 70 with the notch 80 in the revolution of the disk 53, the face of the pawl 70 is much wider than said notch, while an engagement of the latch 77 with the notches 73 and 75 is prevented by means of a lateral flange, 81, on the edge of the disk, as illustrated by the positive line in Figs. 3 and 4, the notches 73 and 75 being illustrated in said figures by means of dotted lines.

The machine is inclosed in the customary manner by a suitable outer casing, C, provided with openings at the top (through which the tablet B, indicating the key last played, may be seen) and over the register-wheels of the adding mechanism, (which indicate the sum of all the denominations of the keys played.)

The register-openings may be covered by a slide, N, (see Fig. 2,) to be locked, if desired.

The several groups of keys in the machine are all mounted upon the one single shaft 1, to which the hand-lever H is attached, and which extends from end to end of the machine; but a separate tripping-arm, 41, extends from said shaft to operate the locking-arm 16 of each separate group of keys. The pawl-shaft 71 is likewise so far extended as to permit a separate arm, 74, to project therefrom under the locking-arm 16 of each group of keys.

It is evident that for the purpose of operating the pawl 70 to release it from the disk 53 the arm 41, depending from the rock-shaft 1, may be brought into direct engagement with the arm 74, projecting from the rock-shaft 71, and, furthermore, that the movement of the hand-lever H, operating to oscillate the shaft 1, may be made to lift the pawl 70 at each stroke of said lever by various obvious and equivalent mechanical devices well known to the art, and which need not herein be described.

In the use of the apparatus a movement of the handle H is required to open the cash-drawer. After the handle has been swung down it will, if released, return automatically to its first position, and in moving upward will permit the cash-drawer to fly open under the action of its spring. The drawer will then remain open in readiness to receive the payment to be deposited. While the drawer thus stands open the handle cannot be moved until a key has been played. By playing a key, to indicate the amount of cash deposited in the drawer, a tablet denoting said amount is thrown up into view, and the mechanism actuating the drawer will be brought into action to close it. The tablet will then remain in view, the drawer will remain closed and locked, and all the keys in the group of which a key has already been played will remain locked until the handle is again worked.

By moving the handle to free the keys and cause the drawer to open the tablet is made to drop, and the amount which is indicated is added to the sum already registered by the adding mechanism. The handle cannot complete its stroke and return to its first position until the tablet has dropped. During the stroke of the handle back and forth all the keys are locked until its movement is completed, so that none of them can be played even should the handle be arrested at any point in its stroke. The adding mechanism is likewise locked, so that no movement thereof can be made excepting by means of a stroke of the handle, during which all other parts of the mechanism are locked or inoperative; nor can the handle be moved while the drawer is partly open. It must be fully opened or closed to permit such a movement.

A single complete stroke of the hand-lever when forced down and allowed to fly up again operates to wind up the spring by which the drawer is automatically moved out, and in releasing the tablets previously thrown up to indicate an amount deposited in the drawer unlocks the keys, releases the drawer, so that it will fly open, and actuates the adding mechanism to register the sum of the last amount deposited added to that previously registered.

The playing of a key in any one or more of the groups will release the open drawer, so that it will close itself and will throw up into sight a tablet indicating the amount denoted by the key.

We claim as our invention—

1. In a cash-indicating machine, the combination of a tablet, a vertically-moving rod carrying said tablet, and a key-lever jointed immediately to said rod to prevent any independent movement of the two, whereby the position of the one shall indicate positively the position of the other, substantially in the manner and for the purpose herein set forth.

2. The combination of the series of parallel key-levers having a uniform length of stroke and a controlling-plate actuated differentially by the stroke of each key-lever, whereby the movement of a second key in the series is prevented until the first key has resumed its normal position, substantially as herein set forth.

3. The combination, with a series of parallel key-levers and a transverse controlling-plate mounted to reciprocate above said key-levers, of a series of differentially curved or inclined fingers severally carried by the key-levers to project therefrom into contact and engagement with said plate to move it, whereby the upward movement of any one key-lever will produce a transverse movement of the controlling-plate differing in its extent from that produced by the movement of any other key-lever in the same series, substantially in the manner and for the purpose herein set forth.

4. The combination of the series of parallel key-levers having a uniform length of stroke, a controlling-plate actuated differentially by the stroke of each key-lever, and an adding mechanism, substantially as described, actuated by the differential movements of the controlling-plate, substantially in the manner and for the purpose herein set forth.

5. The combination, in a cash indicating and adding machine, with a train of adding-wheels, a ratchet-wheel actuating the same, a segmental disk revolving at the side of the ratchet-wheel on the same axis and extending to the outer end of the ratchet-teeth, an oscillating pawl overlapping both the ratchet and proximate controlling-disk, and a toothed wheel or segment attached to said controlling-disk, of a group of oscillating key-levers, an actuating-finger projecting from the upper edge of each lever, a transverse reciprocating controlling-plate mounted immediately above the key-plates to be actuated by an upward movement thereof and moved differentially by each toward the controlling-disk, and a rack carried with the controlling-plate and adapted to gear with the toothed wheel or segment of the controlling-disk, whereby an upward movement of any one key operating to move the controlling-plate and its attached rack to a greater or less extent will thereby move the controlling-disk, so as to determine the point at which, in its movement, the swinging pawl shall engage the teeth of the ratchet-wheel of the adding-train, all substantially in the manner and for the purpose herein set forth.

6. The combination of a group of parallel key-levers, A A, actuating-fingers 7, projecting upwardly therefrom, a transverse strip, 12, mounted to oscillate over the key-levers into engagement with a notch, 15, in the proximate edge of each finger when elevated, upright arms 13, pivoted at their lower ends and carrying said locking-strip on their upper ends, a lever, 16, projecting from the lower pivoted end of one of said arms at about a right angle therewith, a spring, 17, adapted to elevate the lever, a spring-actuated latch, 42, pivoted to the side of the lever near its outer free end, a stop, 43, to limit the down play of the latch, a rock-shaft, 1, mounted transversely to said lever above its outer end, a hand-lever, H, actuating said shaft, an arm, 41, depending from the rock-shaft in proximity to the latch, and a pin, 40, on said arm, adapted to ride under the latch to lift it from its stop in moving forward and over the latch to depress the latch and lever in moving back again, whereby the return movement of the hand-lever after being depressed will operate to depress the lever 16 and release the elevated key from the locking-strip, all substantially in the manner and for the purpose herein set forth.

7. The combination, with the rock-shaft 1, the hand-lever H, actuating the same, the arm 41, depending from the rock-shaft, the pivoted lever 16, whose outer free end extends at a right angle with the shaft 1 in proximity to the arm 41, the spring-actuated latch 42, pivoted upon the side of said lever, and a double-edged pin, 40, upon the proximate side of the arm 41, of a series of ratchet-teeth formed upon the upper and lower edges of said latch 42 and inclined in opposite directions to engage the pin in the movement of said arm and thereby prevent a reverse of the movement of the rock-shaft and hand-lever in either direction, substantially in the manner and for the purpose herein set forth.

8. The combination, substantially as above described, of the rock-shaft 1, the hand-lever H, actuating it, the arm 41, depending therefrom, the group of parallel keys A A, pivoted upon said shaft, a transverse longitudinal plate, 45, upon which the outer ends of the keys rest, pins projecting upward from said movable plate between the keys, lateral catches formed upon the ends of said pins and adapted when moved sidewise to overlap and lock the keys, and a rod, 50, pivoted to the arm 41 and terminating in a wedge-shaped end made to engage the end of the plate 45 at a right angle therewith.

9. The combination, substantially as above described, of the hand-lever H, the spring 24, the rod 21, encircled by said spring and pivoted to the hand-lever, the arm 19, having an offset, 23, through which said rod plays, and the rock-shaft 1, to which said arm is made fast.

10. The combination, in a cash-machine, of a cash-drawer, a crank-wheel, a pitman coupling the wrist of the crank-wheel to the drawer, a spring actuating said crank-wheel, and a hand-lever by whose movement the spring is compressed or energized, substantially in the manner and for the purpose herein set forth.

11. The combination, in a cash-machine, of a cash-drawer, a crank-wheel, a pitman coupling the wrist of the crank-wheel to the drawer, an idle-disk revolving loosely upon the axle of the crank-wheel adjacent thereto, a coiled spring interposed between the crank-wheel and disk and whose ends are secured to the one and the other, a toothed wheel revolving loosely upon the axle adjacent to the idle-disk, a rock-shaft geared to said wheel, a hand-lever by which the shaft is oscillated, and a pawl pivoted to the idle-disk to engage the toothed wheel, whereby the oscillation of the rock-shaft will operate to turn the idle-disk in the direction required to wind the attached spring, substantially in the manner and for the purpose herein set forth.

12. The combination, in a cash-machine, of a spring-actuated crank-wheel, a drawer coupled thereto to be reciprocated thereby at each revolution thereof, a detaining-pawl adapted to engage the crank-wheel at each semi-revolution thereof, and a hand-lever adapted by its movement to lift the pawl, substantially in the manner and for the purpose herein set forth.

13. The combination, in a cash-machine, of a spring-actuated crank-wheel, a drawer coupled thereto to be reciprocated thereby at each revolution thereof, a detaining-pawl adapted to engage the crank-wheel at each semi-revolution thereof, a group of keys, a vibrating locking-strip adapted to be engaged automatically by each key when the key has been played, a lever oscillated by the movement of the locking-strip, and a second lever actuating the detaining-pawl and itself actuated by the movement of said locking-strip lever, whereby the crank-wheel will be released and the drawer be thereby automatically closed whenever any one key is played, all substantially in the manner and for the purpose herein set forth.

14. The combination, substantially as hereinbefore described, of a drawer, a casing inclosing it, a reciprocating arm coupled to one end of the drawer to actuate it, a rack upon the side of the drawer, and pinions mounted to rotate idly in the casing under the rack and to gear therewith to steady the movements of the drawer.

In testimony whereof we have severally signed our names to this specification in the presence of two subscribing witnesses.

WILLIAM KOCH.
CHAS. E. HADLEY.

Witnesses as to Wm. Koch:
  A. N. JESBERA,
  E. M. WATSON.

Witnesses as to C. E. Hadley:
  PERCY L. WATERS,
  FRANK BLAIR RIVES.